United States Patent

[11] 3,615,223

[72] Inventors James E. Burrqughs
 Mount Prospect;
 William G. Kator, Des Plaines, both of Ill.
[21] Appl. No. 831,061
[22] Filed June 6, 1969
[45] Patented Oct. 26, 1971
[73] Assignee Borg-Warner Corporation
 Chicago, Ill.

[54] CEMENT RETARDER DETERMINATION
 3 Claims, 2 Drawing Figs.
[52] U.S. Cl........................................................ 23/230 R,
 106/315, 356/180, 356/195, 356/195
[51] Int. Cl........................................................ G01n 21/20
[50] Field of Search............................................ 23/230;
 106/315

[56] References Cited
 UNITED STATES PATENTS
 528,995 11/1894 Smith............................ 106/315
 OTHER REFERENCES
 A. S. Wexler et al., Mater. Res. Std., 3(5) 364–8 (1963).
 C.A. I, 34: 76784 (1940).
 C.A. II, 59: 3629h (1963).
 C.A. III, 60: 2333b (1964).

Primary Examiner—Morris O. Wolk
Assistant Examiner—Sidney Marantz
Attorneys—Donald W. Banner, William S. McCurry and John W. Butcher ABSTRACT: Method for determining the distribution of a retarder calcium lignosulfonate or tartaric acid, in the dry ingredients of an oil well-cementing composition, wherein a test sample is mixed with an agent to react with or dissolve the retarder, and a spectrophotometric analysis is made to determine the percentage of the retarder in the mix.

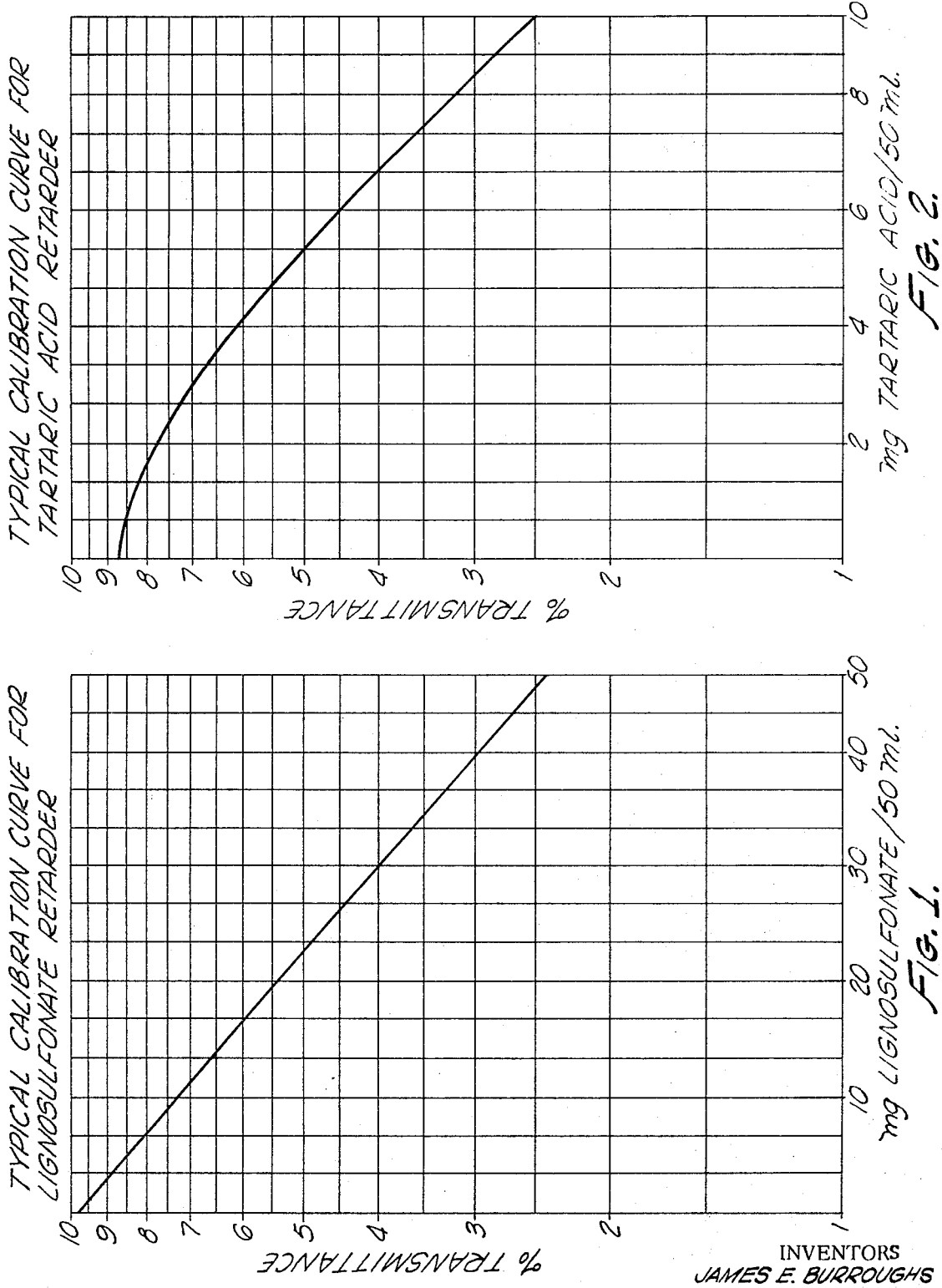

CEMENT RETARDER DETERMINATION

BACKGROUND OF THE INVENTION

In the cementing of casings in boreholes drilled into or through the subsurface earth formation, such as in the cementing of a casing in an oil or gas well, the setting time of the cement slurry sometimes poses problems.

One of the problems encountered in cementing casings in well bores such as oil and/or gas wells, is that considerable time may be involved in the displacement of a suitable volume of a pumpable cement slurry, for example, downwardly through the previously installed casing and thence upwardly through the casing-borehole annulus. Moreover, the deeper the borehole, the higher the subsurface temperatures encountered. The setting time of the cement, which determines the period of time available to effect the desired cement displacement, is affected by the temperature encountered by cement slurry, since as the temperature increases, the setting time decreases.

In order to regulate or control the setting time of well cement slurries it is generally the practice to employ as an ingredient of the cement composition a retarder which extends the setting time of the cement slurry. It is customary, however, that cement compositions are mixed in a dry state and shipped to the well site at which the dry ingredients are mixed with water as the cementing operation progresses. It has been the practice to take test samples of the dry cement materials following blending of the materials in the dry state and to mix such test samples with water, the samples thereafter being allowed to set up so that the setting time of the batch of blended cement may be determined. Such test samples, however, require the utilization of expensive and bulky equipment which may be located conveniently only at test laboratories.

There has long been the need for a more efficient means for determining the distribution of the retarding agents in the dry cement ingredients of a cementing composition, which method does not require the use of expensive and nonportable equipment, but which instead will enable the analysis of the cement mix at any desired location. Analysis of the cement at the well site minimizes the likelihood that improperly blended cement mixes will be employed in the cementing of a well casing resulting in the premature setting of the fluent cement material or isolated portions thereof.

SUMMARY OF THE INVENTION

The present invention provides a method for determining the distribution of a retarder in the dry ingredients of an oil well-cementing composition, such method more particularly involving the mixing of test samples of the dry ingredients with a liquid agent adapted to react with or dissolve the retarder constituent, and thereafter performing a spectrophotometric analysis to determine the percentage of the retarder in the cement composition as a result of the color of the liquid caused by the presence of the retarder. More particularly, the invention contemplates dissolving the retarder in a liquid agent such that the density of the resultant color is indicative of the distribution of the retarder in a test sample of the dry cement ingredients.

In accomplishing the foregoing, the invention contemplates using the usual or customary retarders currently employed to increase the setting time of well cementing slurries, such retarders being, for example, calcium lignosulfonate on the one hand, or tartaric acid and silica flour on the other hand.

In accomplishing the foregoing, the light transmittance of a test sample of cement containing a retarder is compared with the light transmittance of a sample of the retarder as an indication of the percentage of the retarder in the test sample of cement.

An object of the invention is the provision of a simple, fast, accurate, and economical method of determining the presence of the prescribed amount of a retarder in dry blended cement.

BRIEF DESCRIPTION OF THE DRAWINGS

FIG. 1 is a chart showing a light transmittance curve of a selected sample of a calcium lignosulfonate retarder; and FIG. 2 is a chart showing a light transmittance curve of a selected sample of a tartaric acid—silica flour retarder.

DESCRIPTION OF THE PREFERRED EMBODIMENTS

Since the cementing of wells, such as oil and/or gas wells is a time-consuming and costly operation, and the cement must remain in a pumpable state for sufficient time to enable completion of the displacement of the cement slurry, retarders are employed in the mixes whereby to extend the setting time. Such retarders when fully and properly distributed or blended in the dry cement mix, are calculated to prevent premature setting up of the slurry before the pumping operation is complete.

Examples of such retarder materials are calcium lignosulfonate and a 1:1 mixture of tartaric acid and silica flour, the additives being used in percentages up to about 2 percent by weight of the cement in the dry mix.

Heretofore, the dry ingredients have been blended at a blending station and shipped to a well site where the dry ingredients are mixed with the liquid or water into a pumpable slurry. However, if the blending is incomplete, portions of the cement may contain sufficient retarder while other portions of the cement may not contain sufficient retarder as to prevent premature setting of such portions of the cement during a well-cementing operation. In the latter case, the cementing operation is faulty and must be interrupted. In addition, remedial cementing operations must be resorted to in order to complete the cementing job. All of these operations are costly and time-consuming.

The present invention provides for the direct analysis of the retarder content in samples of the blended dry ingredients and avoids the necessity for the usual time-consuming setting time tests in which samples of the cement are actually mixed and allowed to set up. In accomplishing this, the invention employs a colorimetric method whereby to compare the color of a sample of the blended cement when mixed with a liquid with the color produced by the retarder alone when mixed with the liquid.

It has been found that when calcium lignosulfonate is dissolved in water which has been slightly acidified, a bright yellow-orange solution results. Experiments confirmed that the color intensity is directly proportional to the amount of the retarder. Likewise, in a slightly acid medium, tartaric acid reacts with sodium vanadate ($NaVO_3$) to form a reddish-orange complex, the intensity of the color being directly proportional to the concentration of the tartaric acid. Thus, both of these widely used cement retarders provide a basis for direct spectrophotometric or colorimetric determination of the retarders in a cement mixture.

In pursuance of the foregoing, the following experiments were conducted:

A. The Determination of Lignosulfonate Retarder

1. Preparation of the Calibration Curve of FIG. 1.
   a. Exactly 0.500 gm. of the lignosulfonate powder was weighed and transferred to a 250 ml. volumetric flask by the use of deionized water. To the flask was added about 100 ml. of deionized water followed by 10.0 ml. of a 50:50 solution of phosphoric acid ($H_3PO_4$). The flask was then diluted to volume with deionized water. Each milliliter of this solution contained 2.00 mg. of the retarder.
   b. By use of a 25 ml. graduated pipet (or a 50 ml. buret), 0.0, 5.0, 10.0, 15.0, 20.0, and 25.0 ml. of the above stock solution were transferred to six separate 50 ml. volumetric flasks (or 50 ml. glass-stoppered graduated cylinders).
   c. Each flask was diluted to about half its volume with water.
   d. From a buret, 2.0 ml. of the 50:50 $H_3PO_4$ solution was added to each flask, after which, they were diluted to volume with water and mixed well.

e. A portion of each standard solution was transferred to a 1.0 cm. spectrophotometric cell, and the percent transmittance of the yellowish solution was determined at 400 μ. Deionized water was used for zeroing the instrument.

f. Using semilogarithmic chart paper, the percent transmittance was plotted on the Y-axis and the corresponding milligrams of lignosulfonate (per 50 ml. of final solution) were plotted on the X-axis.

2. Analysis of Cement Powder for Lignosulfonate Retarder a. Between 2.3 and 2.7 gms. of the dry cement powder was accurately weighed (±0.001 gm.) into a clean, dry 50 ml. beaker (or vial shell).

b. Approximately 25 ml. of deionized water was added, and after thorough mixing, 2.0 ml. of the 50:50 $H_3PO_4$ solution (dispensed from a 50 ml. buret) was added.

c. The slurry was mixed for 1-2 minutes to ensure complete dissolution of the lignosulfonate.

d. The slurry was filtered through a S&S 589 White Ribbon filter paper, and the clear filtrate was collected in a 50 ml. volumetric flask (or a 50 ml. graduated cylinder.)

e. The beaker was washed with about 20 ml. of deionized water and this wash water was transferred to the filter paper.

f. The filtrate was diluted to exactly 50 ml. with deionized water, and mixed well.

g. The percent transmittance of a portion of the yellow-orange solution was determined at 400 mμ in a 1.0 cm. cell versus water as the reference. A correction for the reagent blank must be applied to the results.

h. The milligrams of lignosulfonate extracted from the sample was determined from the previously prepared calibration curve (FIG. 1). The percent lignosulfonate was calculated from the equation:

$$\text{Percent retarder} = \frac{\text{mg. lignosulfonate found}}{(10) \text{ (gms. sample used)}}$$

B. The Determination of Tartaric Acid Silica Flour Retarder

1. Preparation of the Calibration Curve of FIG. 2 a. Exactly 0.2500 gm. of reagent tartaric acid was transferred to a 250 ml. volumetric flask and diluted to volume with deionized water. Each milliliter of this solution contained 1.00 mg. of the tartaric acid-silica flour retarder.

b. By use of a 25 ml. graduated pipet (or a 50 ml. buret), 0.0, 2.0, 4.0, 6.0, 8.0, and 10.0 ml. of the above stock solution were transferred to 6 separate 50 ml. volumetric flasks (or 50 ml. glass-stoppered graduated cylinders.)

c. Each flask was diluted to about half its volume with deionized water.

d. By use of a 50 ml. buret, exactly 1.0 ml. of the sodium vanadate solution was added. Each flask was mixed well.

e. By use of another 50 ml. buret, exactly 1.0 ml. of the glacial acetic acid was added, followed by thorough mixing.

f. Each flask was diluted to volume with deionized water and mixed well.

g. After about 5-10 minutes, a portion of each solution was transferred to a 1.0 cm. spectrophotometric cell, and the percent transmittance of the reddish-orange solution was determined at 500 μ. Deionized water was used for zeroing the instrument.

h. Using semilogarithmic chart paper, the percent transmittance was plotted on the Y-axis versus the corresponding milligrams of tartaric acid (per 50 ml. of final solution) on the X-axis.

2. Analysis of Cement Powder for Tartaric Acid-Silica Flour Retarder a. Between 0.8 and 1.2 gms. of the dry cement powder was accurately weighed (±0.001 gm.) into a clean, dry 50 ml. beaker (or vial shell).

b. Approximately 4-5 gms. of dry cation exchange resin beads were added to the beaker, followed by approximately 20 ml. of deionized water.

c. After thorough mixing, the slurry was filtered through a S&S 589 White Ribbon filter paper. The clear filtrate was collected in a 50 ml. volumetric flask (or a 50 ml. graduated cylinder).

d. The beaker was washed with about 20 ml. of deionized water, and this wash water was transferred to the filter paper.

e. By use of a 50 ml. buret, exactly 1.0 ml. of sodium vanadate solution of 2.5 percent (W/V) in water was added, followed by thorough mixing of the solution.

f. By use of another 50 ml. buret, exactly 1.0 ml. of the glacial acetic acid was added, followed by thorough mixing of the solution.

g. The flask was diluted to volume with deionized water and thoroughly mixed.

h. A portion of the solution was transferred to a 1.0 cm. cell, and the percent transmittance of the reddish-orange solution was determined at 500 mμ, using deionized water for the reference cell.

i. The milligrams of tartaric acid extracted from the sample were determined from the previously prepared calibration curve (FIG. 2). The percent of the retarder in the sample was calculated by use of the following equation:

$$\text{Percent retarder}[1] = \frac{(2) \text{ (mg. tartaric acid found)}}{(10) \text{ (gms. sample used)}}$$

[1] The factor, 2, is used because tartaric acid is only 50 percent of the composition of the retarder. The other 50 percent is the silica flour. It was assumed that the retarder blend was uniform and that the retarder blend remains uniformly dispersed when mixed with the cement. The uniformity of the retarder blend could be established by applying the procedure outlined above.

The experiments resulted in certain considerations and procedures which are noteworthy.

Attempts to extract the lignosulfonate retarder directly from the cement with either water or water-acetone mixtures always resulted in low recoveries. Although lignosulfonate is very soluble in water, it was believed that the problem was due to an interaction between the lignosulfonate and the metal ions in the ingredients of the cement, causing the formation of water-insoluble lignosulfonate salts. Experiments revealed that the addition of phosphoric acid completely eliminated this problem. Other mineral acids, such as HCL, $H_2SO_4$, and $HNO_3$, are not recommended since they would solubilize the iron in the cement. The color of the ferric ions, which is similar to that of the retarder, would result in erratic determination.

The sodium vanadate solution should be prepared by dissolving 2.5 gm. of the $NaVO_3$ reagent powder in about 50 ml. of water. The solution should be heated on a hot plate or over a low flame until the solution is clear. Finally, the solution should be diluted to 100 ml. with deionized water. Alternately, ammonium vanadate may be used, but in this case, sodium carbonate must be used during the boiling to remove the ammonia.

In the course of developing the method for the analysis of tartaric acid in cements, various attempts to extract the retarder directly from the cement by the use of either water or water-acetone mixtures was unsuccessful. It was deduced that this problem was due to the ionization of various iron and calcium salts present in the cements by the chelation action of the tartaric acid, thereby resulting in low and erratic recoveries of the retarder. The use of the strong cation exchange resin eliminated this problem by preferential adsorption of the metal ions and partially neutralizing the alkalinity of the slurried cement. The controlled use of phosphoric acid may be employed to eliminate the need for both the acetic acid and the resin.

Sample blends of both of the retarders in three different types of cement were prepared to evaluate the developed techniques. In most cases, the desired amount of retarder was weighed into a preweighed amount of the cement to give a final retarder concentration ranging from 0.1-4.0 percent by weight. The results are shown in the following tables 1 and 2:

TABLE 1

Summary of Data for the Determination of
Lignosulfonate Retarder in Dry Blended Cement
Samples (a)

| Type of Cement | % Retarder added | % Retarder found | Absolute error |
|---|---|---|---|
| Class A | 0.41 | 0.40 | −0.01 |
| Class A | 0.51 | 0.52 | +0.01 |
| Class A | 0.79 | 0.74 | −0.05 |
| Class E | 0.00 | 0.19 | +0.19 |
| Class E | 1.46 | 1.55 (b) | +0.09 |
| Class E | 1.30 | 1.36 (b) | +0.06 |
| Class E | 0.42 | 0.42 (b) | 0.00 |
| Class E | 0.61 | 0.62 (b) | +0.01 |
| Class E | 0.91 | 0.89 (b) | −0.02 |
| Class E | 0.19 | 0.17 (b) | −0.02 |
| Trinity Lt.Wt. | 0.19 | 0.20 | +0.01 |
| Trinity Lt.Wt. | 0.83 | 0.75 | −0.08 |
| Trinity Lt.Wt. | 0.99 | 0.86 | −0.13 |

(a) Samples prepared by mixing the dry cement with varying amounts of retarder. The entire sample was then analyzed.
(b) A correction of −2.4 mg./gm. applied to these samples on the basis of the amount of lignosulfonate found per gm. of untreated cement.

TABLE 2

Summary of Data for the Determination of Tartaric
Acid Retarder in Dry Blended Cement Samples
(c)

| Type of Cement | % Retarder added | % Retarder found | Absolute error |
|---|---|---|---|
| Class A | 1.00 | 1.12 | +0.12 |
| Class A | 0.59 | 0.28 | −0.32 (d) |
| Class A | 0.99 | 1.28 | +0.29 (d) |
| Class A | 0.52 | 0.54 | +0.02 |
| Class A | 1.00 | 0.78 | −0.22 (d) |
| Class A | 0.49 | 0.59 | +0.10 |
| Class A | 0.10 | 0.14 | +0.04 |
| Class E | 0.97 | 0.90 | −0.07 |
| Class E | 0.46 | 0.38 | −0.08 |
| Class E | 0.10 | 0.24 | −0.14 |

(c) Samples were prepared by mixing, with various techniques, the dry cement with various amounts of the retarder, portions of which were analyzed.
(d) Appears to be a nonuniform mixture.

The results suggested that the mixing techniques did not result in a homogeneous mixture; for, when standards were prepared and the entire sample was used for the analysis, the recoveries were is agreement with the amount of retarder added.

In the analysis of the Trinity Lightweight cement samples for their lignosulfonate retarder contents, the odor of hydrogen sulfide was detected when the sample was acidified with $H_3PO_4$. Because of the toxicity of hydrogen sulfide, a hood or well-ventilated area should be used when many analyses are to be performed.

The wavelengths used for measuring the intensities of the colors were determined by the statistical evaluation of the data obtained by scanning standard solutions of the retarders on a recording spectrophotometer. Neither of the retarder solutions exhibited a maxima in the region of 400–700 m$\mu$, but yielded a broad absorption band. Although several wavelengths could be used for preparation of the calibration curves, the recommended wavelengths permit the greatest sensitivity per a given concentration of the retarder. The final calibration curves for both retarders were equivalent in accuracy with respect to the analysis of standard mixtures.

We claim:
1. The method of determining the distribution of a retarder comprising calcium lignosulfonate in the dry ingredients of an oil well-cementing composition comprising: taking a sample of the dry cement ingredients including the retarder: mixing the sample with a solution of phosphoric acid in water to dissolve the retarder in the solution; thereafter filtering the mixture to provide a filtrate; and determining the percentage of light transmittance of the filtrate as an indication of the retarder content of the sample.

2. The method of determining the distribution of a retarder comprising tartaric acid in the dry ingredients of an oil well-cementing composition comprising: taking a sample of the dry ingredients including the retarder: mixing the sample with water and a cation exchange resin to dissolve the retarder in the water; thereafter filtering the mixture to provide a filtrate; reacting the filtrate with a solution of sodium vanadate; and determining the percentage of light transmittance of the reacted filtrate as an indication of the retarder content of the sample.

3. The method of claim 2 including adding a quantity of acetic acid to the filtrate.

* * * * *

PO-1050
(5/69)

UNITED STATES PATENT OFFICE
CERTIFICATE OF CORRECTION

Patent No. 3,615,223　　　　　　　　　Dated　October 26, 1971

Inventor(s)　James E. Burroughs and William G. Kator

It is certified that error appears in the above-identified patent and that said Letters Patent are hereby corrected as shown below:

Front Page "Inventors James E. Burrqughs" should be
　--Inventors James E. Burroughs--.
Col. 3, line 4, "$\mu$." should be --m$\mu$--.
　　　line 59, "500 $\mu$." should be --500 m$\mu$--.

Signed and sealed this 6th day of June 1972.

(SEAL)
Attest:

EDWARD M. FLETCHER, JR.　　　　　ROBERT GOTTSCHALK
Attesting Officer　　　　　　　　Commissioner of Patents